United States Patent [19]

McLeod

[11] 3,898,033
[45] Aug. 5, 1975

[54] NOVEL DISAZO DYES AND AQUEOUS CONCENTRATED SOLUTIONS THEREOF
[75] Inventor: John H. McLeod, Tonawanda, N.Y.
[73] Assignee: Allied Chemical Corporation, New York, N.Y.
[22] Filed: June 13, 1973
[21] Appl. No.: 369,682

Related U.S. Application Data
[62] Division of Ser. No. 120,061, March 1, 1971, abandoned.

[52] U.S. Cl................ 8/26; 8/7; 8/41 R; 8/79; 260/175
[51] Int. Cl.² .......................... D06P 1/06
[58] Field of Search ........... 8/26; 260/175, 41 R, 79

[56] References Cited
UNITED STATES PATENTS
2,746,955   5/1956   Armento .................... 260/175
3,701,624   10/1972  Franklin ........................ 8/7

FOREIGN PATENTS OR APPLICATIONS
12,899   1900   United Kingdom ............... 260/175

OTHER PUBLICATIONS
Neale et al., Textile Manufactures, January, 1944, p. 34.

Primary Examiner—Donald Levy
Attorney, Agent, or Firm—Anthony J. Stewart; Jay P. Friedenson

[57] ABSTRACT

Dyestuffs of the formula

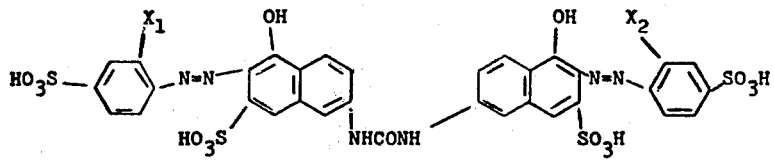

wherein $X_1$ and $X_2$ represent hydrogen, methyl or methoxy and the alkali metal salts thereof. Solutions of these dyes containing up to about 25 weight percent dissolved dye which are characterized by low viscosity and stability to gelation and dye precipitation are useful as homogeneous aqueous dye concentrates for dyeing paper and other cellulosic fibers in fast orange to red shades.

4 Claims, No Drawings

NOVEL DISAZO DYES AND AQUEOUS CONCENTRATED SOLUTIONS THEREOF

This is a division of application Ser. No. 120,061, filed Mar. 1, 1971, and now abandoned.

BACKGROUND OF THE INVENTION

This invention relates to novel disazo dyestuffs and more particularly to novel dyes which color paper and other cellulosic fibers in orange to red shades. It is particularly directed to novel disazo dyes which form concentrated stable, low viscosity aqueous dye solutions.

Recent developments in the dyeing techniques for cellulosic fibers such as paper, involving the introduction of automatic dyeing equipment requiring dyes in concentrated liquid form have intensified the need for water-soluble dyes which can be handled, stored, and charged to dye baths in the form of concentrated aqueous dye solutions. For such uses the concentrated aqueous dye solutions should conveniently contain up to about 25 weight percent dissolved dye, should be of relatively low viscosity to facilitate automatic metered addition to the dyebath, and should be capable of remaining a homogeneous liquid on long term storage even on exposure to elevated temperatures or to alternate freezing and thawing conditions such as occur in a temperate climate.

Known disazo dyes of the type prepared by aqueous alkaline coupling of about two molar proportions of a diazotized primary aromatic amine with about one molar proportion of 6,6'-ureylenebis-1-naphthol-3-sulfonic acid, that is I-acid urea or J-acid urea, while substantive to cellulosic fibers have several serious disadvantages which prevent their use in the form of concentrated aqueous dye solutions. Thus the known disazo dyes derived from I-acid urea are of low water solubility precluding their use in aqueous solutions containing more than about 10 weight percent dissolved dye; have excessively high viscosities in aqueous media which precludes metered addition of their aqueous solutions; and/or form super-saturated aqueous solutions containing about 10 to 25 weight percent dye which metastable solutions on storage rapidly precipitate dye solids or even solidify to gelatinous masses.

The undesirable excessive viscosity of the foregoing known disazo dyes derived from I-acid urea in aqueous media and/or the tendency of such dyes in water to precipitate dye solids or to gel to non-homogeneous masses has necessitated use of a special technique for preparation of these dyes which entails the inconvenient step of carrying out the dyestuff coupling at a moderately elevated temperature for example at about 40°–55°C. This technique provides satisfactory yields of these dyestuffs at moderately dilute concentrations of the dye in the coupling mass such as concentrations of about 4 to 6 weight percent dye, but does not avoid the problems of high viscosity, dyestuff precipitation and gelation associated with more concentrated aqueous solutions of the known dyes.

An object of the present invention is the provision of novel disazo dyestuffs for paper and other cellulosic fibers.

Another object of the invention is the provision of novel storage stable, low viscosity concentrated aqueous solutions of these novel disazo dyes.

These and other objects and advantages will be apparent from the following description of my invention.

SUMMARY OF THE INVENTION

The above objects are attained and the foregoing disadvantages of the above known disazo dyes are overcome in novel dyestuffs of the invention which have the formula

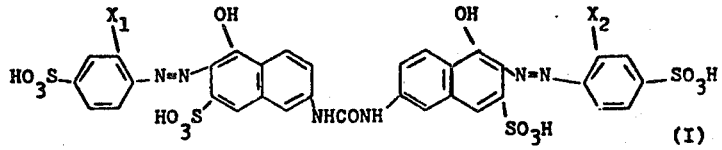

wherein $X_1$ and $X_2$ are independently at each occurrence hydrogen, methyl or methoxy radicals and the alkali metal salts thereof.

The invention also includes aqueous solutions of these dyestuffs which contain up to about 25 weight percent dissolved dye.

The novel dyestuffs of the invention are soluble in water in amounts up to about 10 to 25 weight percent based on the weight of the aqueous dye solution. Such concentrated solutions of the present dyestuffs are surprisingly less viscous than similarly substituted bis(phenyl azo) I-acid urea dyes in aqueous media as is apparent from the comparison of the Table below. The present dye solutions are further uniquely characterized in being more stable to precipitation of dye solids and to gelation on long term storage at room temperature than corresponding solutions of similar I-acid urea disazo dyes by a factor of as much as 2,288 as is apparent from a comparison of the results of Examples 8 and 10 below. The concentrated dye solutions are also stable to precipitation of solids and to gelation on storage at moderately elevated temperatures, for example 50°C. (122°F.) or on storage with exposure to alternate freezing and thawing conditions as is illustrated in Examples 6 and 7 below.

The critical structural features of the present dyestuffs which provide the aforementioned unobvious results in novel dyes of the invention are considered to be the positioning of the sulfonic acid substituent para to the azo linkage in the terminal azophenyl groups of the dyestuffs and the positioning of a hydrogen, methyl or methoxy group ortho to the azo-linkage in the aforementioned terminal phenyl-azo groups.

DETAILED DESCRIPTION OF THE INVENTION AND PREFERRED EMBODIMENTS THEREOF

The dyestuffs of the invention can be prepared in excellent to substantially quantitative yields by conventional aqueous diazotization and aqueous alkaline coupling of sulfanilic acid, ortho-toluidine 4-sulfonic acid, ortho-anisidine 4-sulfonic acid or mixtures thereof into 6,6'-ureylene-bis-1-naphthol-3-sulfonic acid, that is I-acid urea, employing about two molar proportions of the diazotizable amino sulfonic acid per molar proportion of the I-acid urea. Because of the exceptionally good solubility and low viscosity of the present novel dyes in water, the aqueous alkaline coupling mass can be maintained at ambient temperature during coupling and need not be heated to 40°–55°C. in order to obtain satisfactory dye yields as is necessary in the preparation of known bis(phenyl azo) I-acid urea dyestuffs. In other words the aforementioned inconvenient heating technique, prescribed in the preparation of known disazo dyes derived from l-acid urea is not required or of any significant advantage in the preparation of the present novel dyes. Aqueous coupling masses containing up to about 25 weight percent dissolved dyestuff prepared in accordance with the foregoing synthetic procedure can be used directly as the stable, low viscosity concentrated dye solutions of the invention or can be dried, for example by conventional drum drying procedures, to recover the solid dyestuff product without the necessity of salting the dye product out of the coupling mass solution.

Dyestuffs of the invention have excellent substantivity to paper, paper pulp and other cellulosic fibers such as cotton and dye these fibers strongly in attractive orange to red shades which are substantially fast to light, washing, that is to water, and to aqueous alkali and mineral acid. As is desirable in dyes for paper, dyeings of the present dyestuffs are substantially completely discharged on contact with conventional bleaching agents such as 3% by weight aqueous chlorine.

A dyestuff which constitutes a preferred embodiment on the invention because of the particularly attractive dyeing obtained therefrom is a mixture containing from about 20 to 30 mole percent of the dye (II), from about 20 to 30 mole percent of the dye (III) and from about 40 to 60 mole percent of dye of the formula (IV) below about 20 weight percent, of other water soluble dyestuffs of different shade.

The concentrated storage stable, low viscosity dye solutions of the invention can contain up to about 25 weight percent dissolved dye. For practical reasons the concentrated dye solutions of the invention preferably contain at least about 10 weight percent dissolved dye. Especially preferred concentrated dye solutions of the invention contain from about 13 to 20 weight percent dissolved dye.

The novel dyes of the invention can be used in solid form in aqueous dyeing of cellulosic fibers such as cotton and paper according to conventional technique. Preferably the present dyes are utilized in the form of stable concentrated aqueous dye solutions in dyeing of the aforementioned fibers by techniques requiring addition of the dye in liquid form, for example, in automatic paper-dyeing apparatus which requires metered addition of an aqueous dye concentrate to the dye bath. The aqueous dyestuff solutions of the invention containing up to about 25 weight percent dissolved dye can also be utilized as liquid dye concentrates in applying multicolor designs to cellulosic fibers and fabrics without use of conventional textile printing equipment in accordance with the polychromatic pattern dyeing technique described in The American Dyestuff Reporter 59 (1) 56 (1970) and 60 (2) 20 (1971).

In the following examples which serve to illustrate my invention, percentages and proportions are by weight

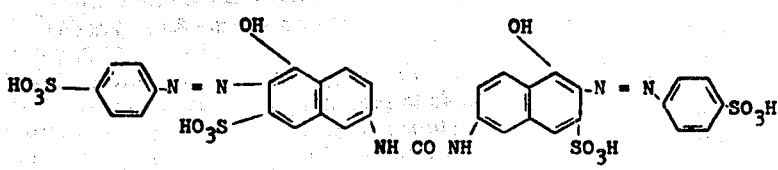

(or alkali metal salt thereof)     (II)

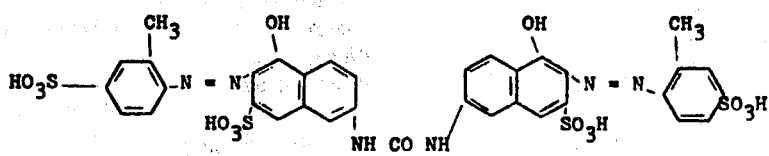

(or alkali metal salt thereof)     (III)

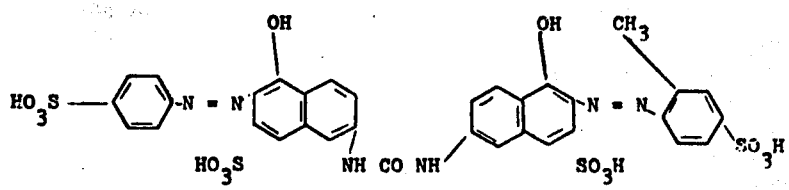

(or alkali metal salt thereof)     (IV)

An especially preferred dye mixture of the invention contains from about 20 to 25 mole percent of dye (II), from about 25 to 30 mole percent of dye (III) and from about 45 to 55 mole percent of dye (IV). Dye compositions of the invention can, if desired, be adjusted to particular hues of red or orange by admixture of up to unless otherwise noted and temperatures are in degrees centigrade.

EXAMPLE 1

Technical grade sulfanilic acid (10.4 g, containing 0.06 mole of sulfanilic acid) is charged to 70 cc of water containing about 0.1 cc of a polyoxyethylene sorbitan monolaurate emulsification agent (Tween 20) and the mixture is agitated for 10 minutes at ambient temperature. After addition of 13 cc of 20° Be aqueous hydrochloric acid, the slurry is agitated for 30 minutes and cooled to about 20°. To the resultant agitated mixture is charged 4.25 g (0.06 mole) of pulverulent sodium nitrite. About 0.50 cc of 30% aqueous sodium nitrite is charge to the mass to provide an excess of nitrous acid during diozotization. The diazotization mass is agitated at 25° for 30 minutes and the excess nitrous acid therein is destroyed by addition of sulfamic acid. The resultant aqueous diazotized sulfanilic acid is charged over a 30 minute period to an agitated mixture of technical grade 6,6'-ureylene-bis-1-naphthol-3-sulfonic acid (14.4 g, containing 0.0285 mole of the 6,-6'-ureylene-bis-1-naphthol-3-sulfonic acid) in 60 cc of water containing about 0.1 cc of a polyoxyetheylene sorbitan monoalurate emulsification agent and about 8.0 g of sodium bicarbonate which has been agitated for 10 minutes heated to 60° and cooled to 25°. During the addition of the diazotized sulfanilic acid to the coupling component, the temperature of the mixture is in range of about 20°–28° and an additional 3.0 g of sodium becarbonate are charged to the mixture to maintain the coupling mixture alkaline to nitrazol yellow indicator. The resultant aqueous coupling mass (130 g) is a dark red solution clear of suspended solids containing 27.4 g (0.0285 mole) of dye corresponding to 21.1% concentration of dye in solution or to about 0.022 mole percent dye based on the weight of the coupling solution. The dye solution is diluted by addition of 62 g of water to a dye concentration of 14.25% and the viscosity of the solution is determined at 25° with a Brookfield viscometer to be 38.5 centipoises. A portion of the diluted solution which gives an excellent orange dyeing of paper is evaporated to dryness to recover the tetrasodium salt of the dyestuff which in its free acid form has the formula

EXAMPLE 2

The procedure of Example 1 is repeated substantially as described except that 11.2 g (0.06 moles) of ortho-toluidine sulfonic acid is employed as the diazo reactant instead of sulfanilic acid. The aqueous coupling mass (130 g) which is obtained is a dark red solution clear of suspended solids containing 28.2 g (0.0285 mole) of dye corresponding to a concentration of 21.7% of dye in solution or to about 0.022 mole percent dye based on the weight of the coupling solution. The dye solution is diluted by addition of 68 g of water to a dye concentration of 14.25%, the Brookfield viscosity at 25° of the diluted solution being 68 centipoises. A portion of the diluted solution which provides an excellent orange dyeing of paper is evaporated to dryness to recover the tetrasodium salt of the dyestuff which in its free acid form has the formula

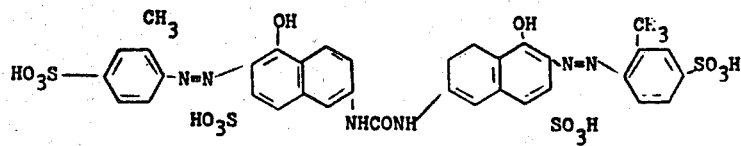

EXAMPLE 3

The procedure of Example 1 is repeated substantially as described except that a mixture of 4.93 g (0.0285 mole) of sulfanilic acid and 5.89 g (0.0315 mole) of ortho-toluidine-4-sulfonic acid is charged as the diazo reactant in place of sulfanilic acid. The aqueous coupling mass (146 g) which is obtained is a dark red solution, clear of suspended solids, which contains 27.8 g (0.0285 mole) of dye corresponding to a 19.1% concentration of dye in solution or to about 0.0196 mole percent dye based on the weight of the solution. The dye solution is diluted to a concentration of 14.25% dye by addition of 49 g of water, the Brookfield viscosity of the diluted dye solution being 57 centipoises at 25°. A portion of the diluted dye solution which provides an excellent orange dyeing of paper is evaporated to dryness to obtain a mixture of tetrasodium salts of the following dyes which in their free acid form have the following formulae

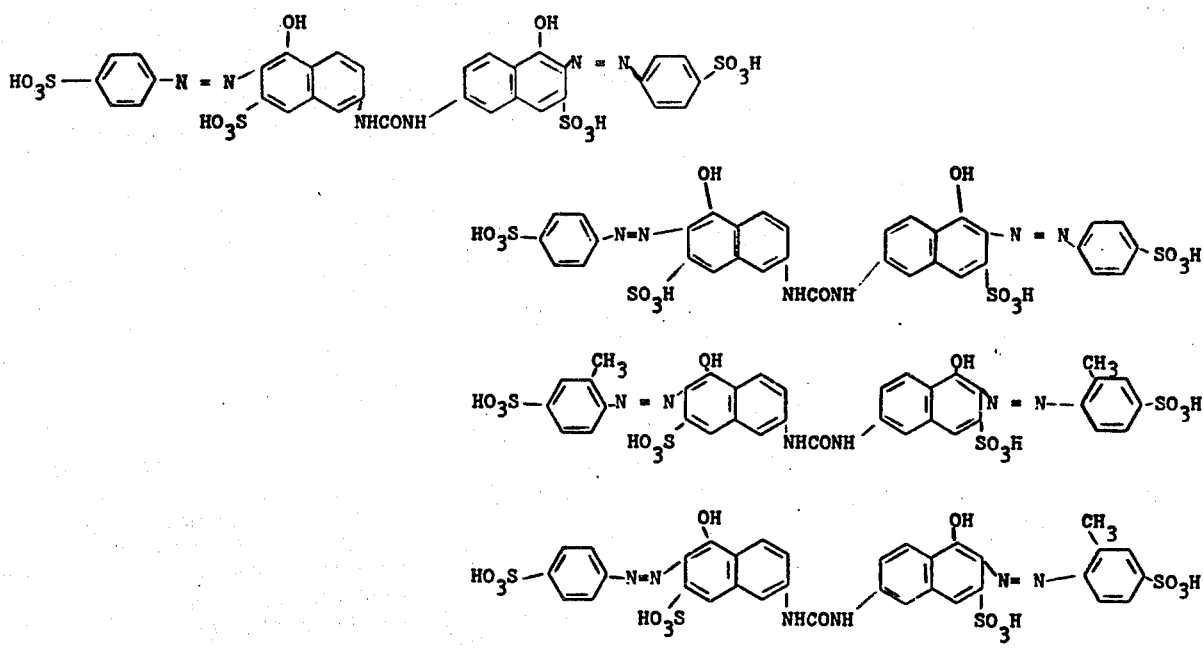

The molar ratio of the foregoing three dyes in the above dried product mixture and in the aforementioned dye solutions is about 1:1.2:2.2.

The following comparative Examples 4–5 relate to dyestuffs structurally similar to the dyes of the invention which do not possess the desirable solubility and solution properties of the present dyestuffs.

EXAMPLE 4

The procedure of Example 1 is repeated substantially as described except that about 10.4 g (0.06 mole) of metanilic acid is employed as the diazo reactant in place of sulfanilic acid and about 1.0 cc of 30% aqueous sodium nitrite is charged to provide excess nitrous acid during diazotization. At the end of the 30 minute coupling period there is obtained an opaque paste (141 g) containing orange solid suspended in a dark red liquid which continues to precipitate orange solid for several minutes after completion of the coupling reaction.

The coupling mass contains 27.4 g of dye corresponding to 19.43% dye based on the weight of the mass. The coupling mass is diluted to a dye content of 14.25% by addition of 51 g of water. A portion of the resultant slurry which is unsuitable as a homogeneous dye solution for coloring paper is evaporated to dryness to recover the tetrasodium salt of the dye which in its free acid state has the formula

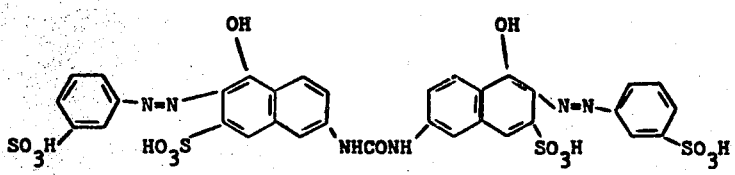

The viscosity of the 14.25% dye slurry is determined as in Example 1 and is compared with the viscosities of 14.25% dye solutions of the invention of Examples 1–3 in the Table below.

EXAMPLE 5

The procedure of Example 1 is repeated substantially as described except that 12.1 g (0.06 mole) of 2,3-xylidine-4-fanilic acid and 2.2 cc of 30% aqueous sodium nitrite is charged to provide excess nitrous acid during diazotization. At the end of the 30 minute coupling period there is obtained an opaque paste (123 g) containing orange solid suspended in a dark red liquid which continues to precipitate orange solid for several minutes after completion of the coupling reaction. The coupling mass contains 28.8 g of dye corresponding to 23.4% dye based on the weight of the coupling mass. The coupling mass is diluted to a dye content of 14.25% by addition of 79 g of water. A portion of the resultant slurry which is unsuitable as a homogeneous dye solution for coloring paper is evaporated to dryness to recover the tetrasodium salt of the dye which in its free acid state has the formula

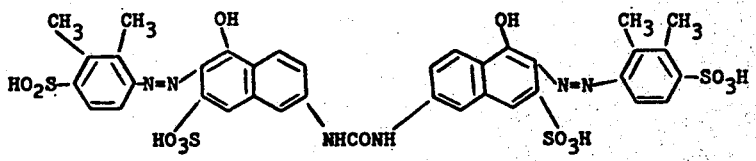

The viscosity of the 14.25% dye slurry is determined as in Example 1 and is compared with the viscosities of 14.25% dye solutions of the invention of Examples 1–3 in the Table below.

TABLE

| Dyestuff In Diluted Coupling Mass | Concentration of Dye In Diluted Aqueous Coupling Mass (weight percent) | Appearance of Diluted Coupling Mass | Viscosity of Diluted Coupling Mass (in Centipoises as determined at 25° with a Brookfield viscometer) |
|---|---|---|---|
| Dyestuff product of Example 1 | 14.25 | dark red homogeneous solution clear of suspended solids | 38.5 |
| Dyestuff product of Example 2 | '' | '' | 68 |
| Dyestuff mixture of Example 3 | '' | '' | 57 |
| Dyestuff product of Example 4 | '' | an opaque slurry consisting of an orange solid suspended in a dark red liquid | 6,200 |
| Dyestuff product of Example 5 | '' | an opaque slurry consisting of an orange solid suspended in a dark red liquid | 55,000 |

The unusually low viscosities of the aqueous dyes of the invention as compared to the excessively high viscosities of non-homogeneous aqueous dye masses of Examples 4 and 5 further demonstrate the suitability of the present dye solutions as concentrated dye solutions.

EXAMPLE 6

Samples of the 14.25% dye solutions of Examples 1, 2, and 3 are sealed in glass bottles and stored at a constant temperature of about 50°. The samples are examined at regular intervals to determine if precipitation of dye solids has occurred. The dye solution of Example 1 exhibits precipitation of solids only after 96 hours of storage. The dye solutions of Examples 2 and 3 exhibit no precipitation of solids even after storage at 50° for 168 hours.

EXAMPLE 7

Samples of the 14.25% dye solutions of Examples 1, 2 and 3 are sealed in bottles and subjected to alternate freezing and thawing conditions to determine the stability of the concentrated dye solutions toward thermal shock. In each freeze-thaw cycle the samples are maintained at below about 0° for from 21 to 69 hours to freeze the samples and are then allowed to stand for about three hours at room temperature, that is at about 20°–28° in order to thaw the samples. At the end of each thawing period the liquid samples are examined for presence of suspended dye solids. The dye solutions of Examples 1, 2 and 3 remain homogeneous liquids devoid of suspended dye solids even after being subjected to five successive alternate freezings and thawings.

EXAMPLE 8

The procedure of Example 1 is repeated, substantially as described in diazotizing and coupling in aqueous media about 0.06 molar proportions of ortho-anisidine-4-sulfonic acid into about 14.4 g (0.0285 mole) of 6,6'-ureylene-bis-1-naphthol-3-sulfonic acid. The resultant coupling mass (193 g) which is a clear dark red solution devoid of suspended solid dyestuff contains about 14.6% of the tetrasodium salt of the dyestuff which in its free acid form has the formula

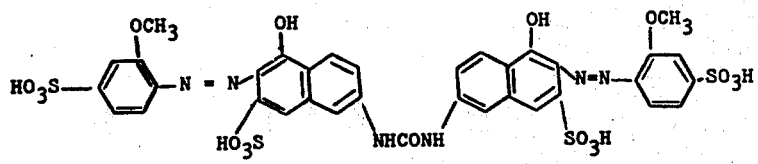

The dye solution is an excellent liquid red dye for paper dyeing the latter in attractive red shades fast to light and washing. The dye solution on storage at room temperature, that is at about 20°–28° for 286 days has a relatively low viscosity of only 103 centipoises as measured on a Brookfield viscometer at 25°, and remains a homogeneous solution devoid of suspended dye solids.

The following comparative Examples 9 and 10 relate to dyestuffs structurally similar to that of Example 8 which however do not possess the desirable solubility and solution properties of the Example 8 dyestuff.

EXAMPLE 9

The procedure of Example 1 is repeated substantially as described in diazotizing and coupling 0.06 mole of ortho-anisidine-5-sulfonic acid into 0.0285 mole of 6,6'-ureylene-bis-1-naphthol-3-sulfonic acid. The resulting aqueous coupling mass (201 g) is an exceeding viscous opaque aqueous paste containing bright red dye solid suspended in a dark red liquor. The coupling mass which is unsuitable as a homogeneous dye solution for coloring paper, contains about 14% of the tetrasodium salt of the dye which in its free acid form corresponds to the formula

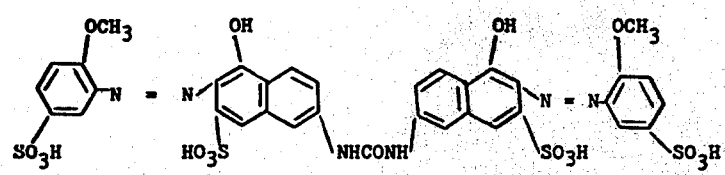

EXAMPLE 10

The procedure of Example 1 is repeated substantially as described in diazotizing and coupling 0.06 mole of paraanisidine-3-sulfonic acid into 0.0285 mole of 6,6'-ureylene-bis-1-naphthol-3-sulfonic acid. The resulting aqueous coupling product (225 g) is an exceedingly viscous red solution which on standing for about three hours at room temperature forms a non-pourable aqueous gel containing about 12.5% of the tetrasodium salt of the dye which in its free acid form corresponds to the structural formula

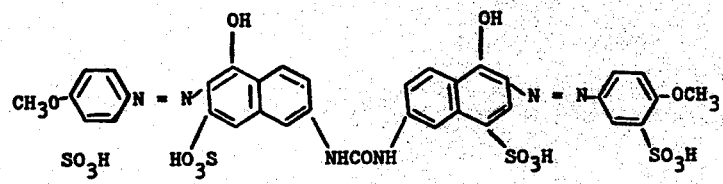

The product gel is unsuitable as a homogeneous dye concentrate for coloring paper.

The following Example 11 illustrates the use of the present dyes in coloring paper.

EXAMPLE 11

About 4 g of the 14.25% aqueous dye solution of Example 3 is diluted to 500 ml by addition of 496 g of water at ambient temperature. A 10 ml portion of the resultant solution is charged to 250 ml of an aqueous slurry of 3 g of paper pulp (Puget Sound Bleached Sulfite pulp) and the resultant mixture is agitated at ambient temperature for about 10 minutes. To the mixture are charged 1 ml of a 3% aqueous slurry of a fortified rosin size (Pexol, Hercules Powder Co.) and 3 ml of a 10% aqueous solution of alum (aluminum sulfate octadecahydrate). After being agitated for an additional 20 minutes, the mixture is diluted to 2000 ml by addition of water and filtered through a metal screen. The resultant paper sheet which forms on the screen is pressed between two layers of blotting paper to express any adherent dye liquor and dried at about 100°. There is thus obtained an excellent orange paper dyeing.

When the foregoing procedure is repeated omitting the size and alum there is also obtained an excellent orange paper dyeing.

The dyeings exhibit relatively good fastness to water, aqueous caustic, and aqueous acid and are substantially completely discharged on contact with 3% chlorine water.

The dyes of Examples 1, 2 and 8 also provide excellent paper dyeings by the aforementioned dyeing procedure.

By the foregoing reaction technique 5, employing a mixture of sodium bicarbonate and potassium bicarbonate or a mixture of sodium bicarbonate and lithium bicarbonate as the alkaline agent in coupling step the following additional representative dyestuffs of the invention can be prepared

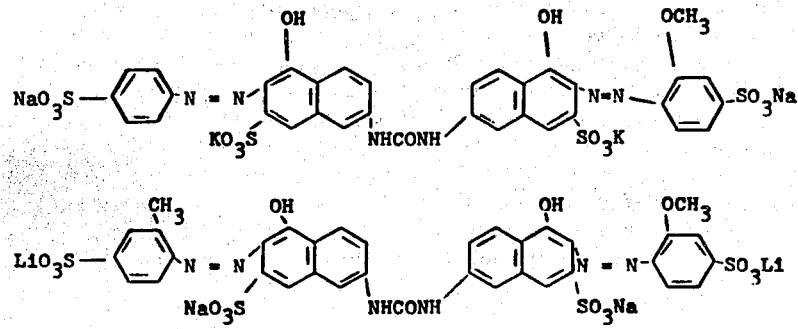

I claim:

1. A mixture of dyestuffs comprising at least two different compounds having the general formula

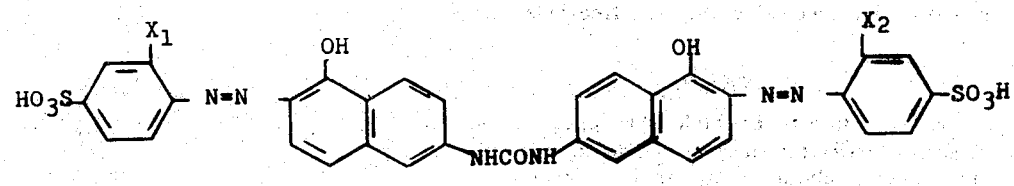

wherein $X_1$ and $X_2$ are hydrogen, methyl or methoxy, or the alkali metal salts thereof.

2. A mixture as claimed in claim 1 which is a mixture of from about 20 to 30 mole percent of the dyestuff wherein $X_1$ and $X_2$ are hydrogen, from about 20 to 30 mole percent of the dyestuff wherein $X_1$ and $X_2$ are methyl and from about 40 to 60 mole percent of the dyestuff wherein $X_1$ is hydrogen and $X_2$ is methyl.

3. A mixture of as claimed in claim 2 which contains from about 20 to 25 mole percent of the dyestuff wherein $X_1$ and $X_2$ are hydrogen from about 25 to 30 mole percent of the dyestuff wherein $X_1$ and $X_2$ are methyl and from about 45 to 55 mole percent of the dyestuff wherein $X_1$ is hydrogen and $X_2$ is methyl.

4. A mixture as claimed in claim 3 wherein the component dyestuffs are tetrasodium salts.

* * * * *